No. 696,642. Patented Apr. 1, 1902.
C. L. V. KINNEY.
MECHANISM FOR TRANSMITTING POWER FROM VEHICLE GROUND WHEELS.
(Application filed Dec. 7, 1901.)
(No Model.)
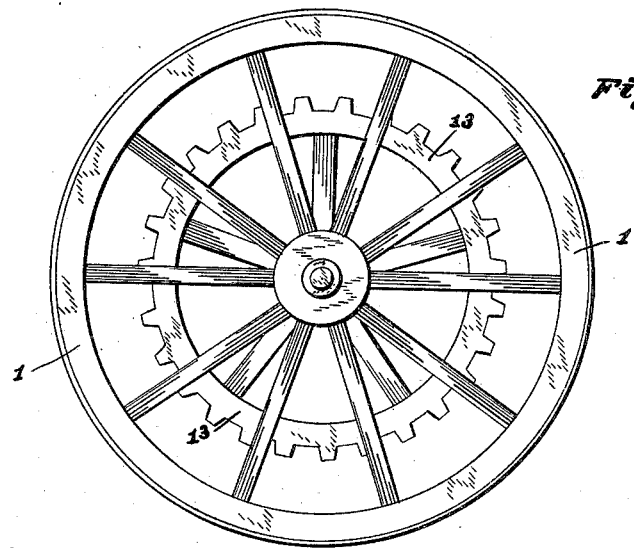
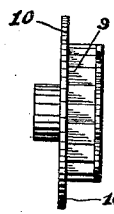
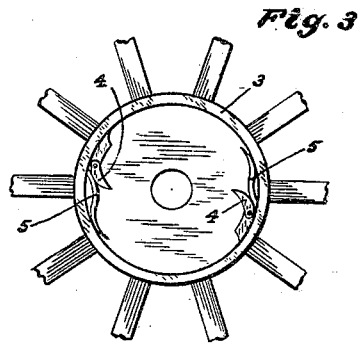
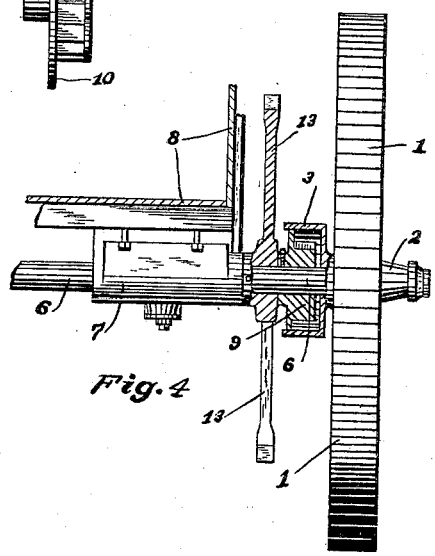
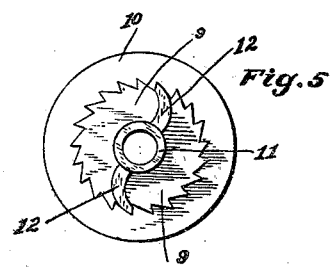
WITNESSES:
F. G. Zwerner
A. L. Phelps
INVENTOR
Clement L. V. Kinney
BY
C. C. Shepherd
ATTORNEY
THE NORRIS PETERS CO., PHOTO-LITHO., WASHINGTON, D. C.

_UNITED STATES PATENT OFFICE._

CLEMENT L. V. KINNEY, OF NEWARK, OHIO, ASSIGNOR TO THE NEWARK MACHINE COMPANY, OF NEWARK, OHIO, A CORPORATION OF OHIO.

MECHANISM FOR TRANSMITTING POWER FROM VEHICLE GROUND-WHEELS.

SPECIFICATION forming part of Letters Patent No. 696,642, dated April 1, 1902.

Application filed December 7, 1901. Serial No. 84,989. (No model.)

_To all whom it may concern:_

Be it known that I, CLEMENT L. V. KINNEY, a citizen of the United States, residing at Newark, in the county of Licking and State of Ohio, have invented a certain new and useful Improvement in Mechanism for Transmitting Power from Vehicle Ground-Wheels, of which the following is a specification.

My invention relates to the improvement of power transmission from vehicle-wheels; and the objects of my invention are to provide an improved construction whereby rotary motion is transmitted to a sprocket or belt wheel through the rotary traveling motion of a vehicle ground-wheel; to provide improved connections between a vehicle or wagon ground-wheel and a sprocket, belt, or other power-contributing wheel which will facilitate the running of mechanism carried by said vehicle; to provide improved means for insuring the proper engagement of the teeth of the operating ratchet-wheel and ground-wheel pawls or dogs, and to provide other improvements, the details of which will be more fully pointed out hereinafter. These objects I accomplish in the manner illustrated in the accompanying drawings, in which—

Figure 1 is an outer face view of a vehicle ground-wheel having my improvement thereon. Fig. 2 is a view in elevation of the ratchet-wheel which I employ in the manner hereinafter described. Fig. 3 is an inner side view of the ground-wheel hub. Fig. 4 is a view, partly in elevation and partly in section, showing a vehicle ground-wheel having my improved power-transmitting mechanism thereon; and Fig. 5 is an inner face view of the ratchet-wheel shown in Fig. 2.

Similar numerals refer to similar parts throughout the several views.

The mechanism hereinafter described is designed particularly to contribute rotary motion to a chain or belt carrying wheel from the ground-wheel of a wagon for the purpose of transmitting motion to mechanism carried on the wagon; but in the illustration and description I will confine myself to the means of imparting motion to the power-wheel, as it is obvious that various gear connections might be provided between the mechanism carried by the wagon and said power-wheel.

1 represents the ground-wheel of a wagon or other vehicle, this ground-wheel being formed with a central hub portion 2, the latter having an inward projection terminating in a cup-like casing or body 3. At diametrically-opposite points within said cup projection 3 and adjacent to the inner circular wall thereof I pivot the inner ends of pawls or dogs 4, the engaging points or outer ends of which are normally projected inward toward the hub-center through the medium of spring-strips 5.

6 represents the horizontal axle or shaft, upon the outer spindle end of which is rotatably mounted the hub of the ground-wheel 1, said shaft or axle being in turn rotatably mounted in a bearing-box 7, which depends from the under side of the vehicle-frame 8. Upon the axle or shaft 6 is keyed a ratchet-wheel 9, the latter having its rear portion provided with an enlargement or circular flange 10. In constructing the body of the ratchet-wheel 9 I form the same on its outer face and about its central opening with a shallow outwardly-projecting neck 11, and on opposite sides of its neck portion I form the outer face of said ratchet-wheel with curved outwardly-projecting tooth-like lugs 12, each of the latter curving, as shown, to meet one of the notches formed by the teeth of said ratchet-wheel. Between the ratchet-wheel and the bearing 7 I secure upon the shaft or axle 6 a power-wheel 13, which may, as indicated in the drawings, be in the nature of a sprocket-wheel adapted to receive a chain belt or which may be in the nature of a suitable gear or belt wheel. In slipping the ground-wheel 1 onto the outer end portion of the axle or shaft 6 and at the same time causing the cup-like hub projection 3 to incase the ratchet-wheel 9 it is obvious that the forwardly-projecting pawls or dogs 4 will by contact with the face of the ratchet-wheel operate to prevent the complete insertion of said ratchet-wheel or such insertion as to insure the engagement of the pawls with a tooth thereof. It is obvious, however, that by a partial rotation of the wheel the inwardly-projecting pawls will be brought into contact with the curved guide-lugs 12 of the ratchet-wheel, and through the latter said pawls will be guided outward into positions permitting them to drop into engagement with the ratchet-teeth when the ground-wheel is pressed farther inward.

From the construction herein described it will be readily understood that the rotation of the ground-wheel imparted by the traveling movement of the vehicle and the engagement of the pawls with the teeth of the ratchet-wheel must result in the rotation of the shaft or axle 6 and in a consequent rotation of the power-wheel 13. It is obvious, however, that when a reversed rotation is imparted to the ground-wheel that the pawl ends will slip over the teeth of the ratchet-wheel and prevent a rotation of said power-wheel.

It will be seen from the construction and operation herein shown and described that simple, reliable, and effective means are provided for transmitting power from the ground-wheels of a wagon or other vehicle to a power-wheel and that through this operation mechanism carried by the wagon may have desirable motion imparted thereto.

Having now fully described my invention, what I claim, and desire to secure by Letters Patent, is—

1. In a mechanism for transmitting power from vehicle-wheels, the combination with a journaled axle 6, a ground-wheel rotatably mounted thereon, said ground-wheel having a cup-like inward projection and spring-actuated pawls pivoted within said cup projection, of a ratchet-wheel keyed on said axle and adapted to be received by said cup projection and to be engaged by said pawls and a power-wheel 13, carried by said axle, substantially as specified.

2. In a mechanism for transmitting power from vehicle ground-wheels, the combination with the journaled axle 6, a ground-wheel rotatably mounted thereon, said ground-wheel having a cup-like inward projection 3 and spring-actuated pawls within said cup projection, of a ratchet-wheel carried on said axle 6, said ratchet-wheel adapted to be received by said cup projection and having formed on its face and on opposite sides of its central opening curved guide-lugs 12 each leading to a tooth-notch of said wheel and a power-wheel 13 carried on said axle 6, substantially as specified.

CLEMENT L. V. KINNEY.

In presence of—
JNO. T. MCCUNE,
E. C. SHARPE.